US012190582B2

(12) United States Patent
Amir et al.

(10) Patent No.: US 12,190,582 B2
(45) Date of Patent: *Jan. 7, 2025

(54) AUTOMATED EVENT DETECTION AND PHOTO PRODUCT CREATION

(71) Applicant: Shutterfly, LLC, San Jose, CA (US)

(72) Inventors: Roy Amir, Haifa (IL); Nimrod Aroyo, Herzeliyah (IL); Nadav Ribak, Haifa (IL); Yanay Hollander, Afula (IL); Tomer Shalev, Haifa (IL)

(73) Assignee: Shutterfly, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,321

(22) Filed: May 1, 2023

(65) Prior Publication Data
US 2023/0360395 A1    Nov. 9, 2023

Related U.S. Application Data

(63) Continuation of application No. 17/393,118, filed on Aug. 3, 2021, now Pat. No. 11,676,380, which is a
(Continued)

(51) Int. Cl.
*G06V 20/30* (2022.01)
*G06F 16/58* (2019.01)
*G06T 11/60* (2006.01)

(52) U.S. Cl.
CPC .......... *G06V 20/30* (2022.01); *G06F 16/5866* (2019.01); *G06T 11/60* (2013.01)

(58) Field of Classification Search
CPC ...... G06V 20/30; G06F 16/5866; G06T 11/60
See application file for complete search history.

(56) References Cited

U.S. PATENT DOCUMENTS

| 7,289,132 | B1 | 10/2007 | Reid et al. |
| 8,289,561 | B2 | 10/2012 | Ono |

(Continued)

OTHER PUBLICATIONS

Pere Obrador, Nathan Moroney, "Automatic image selection by means of a hierarchical scalable collection representation," Proc. SPIE 7257, Visual Communications and Image Processing 2009, 72570W (Jan. 19, 2009); (Year: 2009).*

(Continued)

*Primary Examiner* — Chuen-Meei Gan
(74) *Attorney, Agent, or Firm* — Merchant & Gould P.C.

(57) ABSTRACT

A computer-implemented method for automatically detecting events and creating photo-product designs based on the events in a photo-product design system includes automatically identifying an event by an event detection module based on daily numbers of captured photos over a plurality of days, automatically selecting a photo-product type by an intelligent product design creation engine in the photo-product design system, calculating a daily weight for a photo product design in the photo-product type based on the daily numbers of captured photos, automatically determining a number of product photos allocated to each day based on associated daily weight, automatically selecting product photos from the captured photos each day at the event according to the number of product photos allocated to each day, and automatically creating a photo-product design for the event using the selected product photos.

20 Claims, 8 Drawing Sheets

Related U.S. Application Data continuation of application No. 15/972,955, filed on May 7, 2018, now abandoned.

(56) References Cited

U.S. PATENT DOCUMENTS

| | | |
|---|---|---|
| 9,077,823 B1 | 7/2015 | Grosz et al. |
| 11,676,380 B2 | 6/2023 | Amir |
| 2004/0032599 A1 | 2/2004 | Atkins et al. |
| 2006/0220983 A1 | 10/2006 | Somura et al. |
| 2011/0206284 A1* | 8/2011 | Das .................. G06F 18/24 |
| | | 382/224 |
| 2012/0082401 A1 | 4/2012 | Berger et al. |
| 2014/0297645 A1* | 10/2014 | Cohen .................. G06F 16/447 |
| | | 707/737 |
| 2016/0093083 A1* | 3/2016 | Chen .................. G06T 11/60 |
| | | 382/224 |
| 2019/0340305 A1 | 11/2019 | Amir |

OTHER PUBLICATIONS

Xue et al.; "Automatic photobook: focusing on image selection and image layout based on content and composition." In Imaging and Printing in a Web 2.0 World IV, vol. 8664, p. 86640D, International Society for Optics and Photonics, 2013. (Year: 2013).

Obrador, Pere et al.; Automatic Image Selection by Means of Hierarchial Scalable Collection Representation; Jan. 19, 2009; 13 pages.

* cited by examiner

Total Images: 400

Images in photobook: 100

Day 1: 20%   (20 photos)
Day 2: 17.5% (17 photos)
Day 3: 22.5% (23 photos)
Day 4: 6.3%  (6 photos)
Day 5: 18.8% (19 photos)
Day 6: 15%   (15 photos)

Day 3
Total images: 90

Daily weight 22.5% or 23 photos

Scene 3
Scene weight: 50% (12 photos)

All 45 Photos are scored to pick 12

AUTOMATED EVENT DETECTION AND PHOTO PRODUCT CREATION

CROSS-REFERENCE TO RELATED APPLICATION(S)

This application is a continuation of U.S. patent application Ser. No. 17/393,118, filed on Aug. 3, 2021, which is a continuation of U.S. patent application Ser. No. 15/972,955, filed on May 7, 2018, the disclosures of which are hereby incorporated by reference in their entireties. To the extent appropriate a claim of priority is made to the above-disclosed applications.

TECHNICAL FIELD

This application relates to digital imaging technologies and photo products, and in particular, to technologies that can automate photo-product designs with no or minimal user input.

BACKGROUND OF THE INVENTION

With the advancement of consumer electronic devices, a vast number of pictures are taken by mobile devices and digital cameras. Digital images can be incorporated into product designs for products such as photo books, photo calendars, photo greeting cards, posters, photo décor, photo mugs, photo T-shirts, photo magnets, photo coasters, photo aprons, and so on.

A photo product can include one or more pages. Designing a photo product can include many iterative steps such as selecting an overall style, selecting suitable images, selecting a layout for each page, assigning images to each page, inputting text, rearranging the pages, the images and the text. The product creation process can be quite time consuming. Increasingly, photo products are designed using mobile devices.

There continues to be a need for a method to enable users to design photo products in a convenient and time efficient manner.

SUMMARY OF THE INVENTION

The present application discloses system and method that can significantly enhance users' experiences associated with designing personalized photo products. Automated tools have been developed to automatically detect events from the photos taken by user devices and to automatically create designs of photo products.

An advantageous feature of the presently disclosed invention is that the activities and events that a user has been participating are automatically identified without user input. These identified events and activities are used as triggers to create photo-product designs without user initiation. The photo-product type, style and layouts are automatically selected for the event. The disclosed method and system can significantly save users' time and make it much more convenient for users to use their photos on their devices.

Another advantage of the presently disclosed invention is that disclosed methods and systems can proactively identify possibilities for photo products that the users themselves may not have realized, which help the users to preserve their memories.

In one general aspect, the present invention relates to a computer-implemented method for automatically detecting events and creating photo-product designs based on the events in a photo-product design system. The method includes automatically identifying an event by an event detection module based on daily numbers of captured photos over a plurality of days; automatically selecting a photo-product type by an intelligent product design creation engine in the photo-product design system; calculating a daily weight for a photo product design in the photo-product type based on the daily numbers of captured photos; automatically determining a number of product photos allocated to each day based on associated daily weight; automatically selecting product photos from the captured photos each day at the event according to the number of product photos allocated to each day; and automatically creating a photo-product design for the event using the selected product photos.

Implementations of the system may include one or more of the following. The daily weight can be determined by an associated daily number of captured photos divided by a total number of captured photos in the event. The number of product photos allocated to each day in the event can be determined by a product of the associated daily weight and a total number of captured photos in the event. The computer-implemented method can further include automatically merging adjacent captured photos in a day into one or more scenes; calculating a scene weight for the photo product design based on numbers of captured photos in the one or more scenes; automatically determining a number of product photos allocated to each of the one or more scenes based on associated scene weight; and automatically selecting product photos from the captured photos at each of the one or more scenes according to the number of product photos allocated to each of the one or more scenes. The scene weight can be determined by a number of captured photos of an associated scene divided by a total number of captured photos in an associated day in the event. The number of product photos allocated to each of the one or more scenes can be determined by a product of the associated scene weight and a total number of captured photos in the associated day. The computer-implemented method can further include automatically selecting a product style for the photo-product design by the intelligent product design creation engine. The computer-implemented method can further include automatically selecting a product layout for the photo-product design by the intelligent product design creation engine. The step of automatically selecting product photos from the captured photos can include ranking the captured photos and automatically selecting the product photos from the captured photos based on the ranking of the captured photos. The step of automatically identifying an event by an event detection module can include determining an average number of captured photos per day; and identifying the event by the event detection module by comparing daily numbers of captured photos over the plurality of days to the average number of captured photos per day. The event can be identified by the event detection module when a daily number of captured photos is at least 50% higher than the average number of captured photos per day. The event can include a single day. The event can include multiple days.

In another general aspect, the present invention relates to a photo-product design system for automatically detecting events and creating photo-product designs for the events. The photo-product design system includes an event detection module that can automatically identify an event based on daily numbers of captured photos over a plurality of days; and an intelligent product design creation engine that can automatically select a photo-product type, to calculate a daily weight for a photo product design in the photo-product type based on the daily numbers of captured photos, automatically determine a number of product photos allocated to each day based on associated daily weight, automatically select product photos from the captured photos each day at the event according to the number of product photos allocated to each day, and automatically create a photo-product design for the event using the selected product photos These and other aspects, their implementations and other features are described in detail in the drawings, the description and the claims.

DETAILED DESCRIPTION OF THE INVENTION

Figure 1:
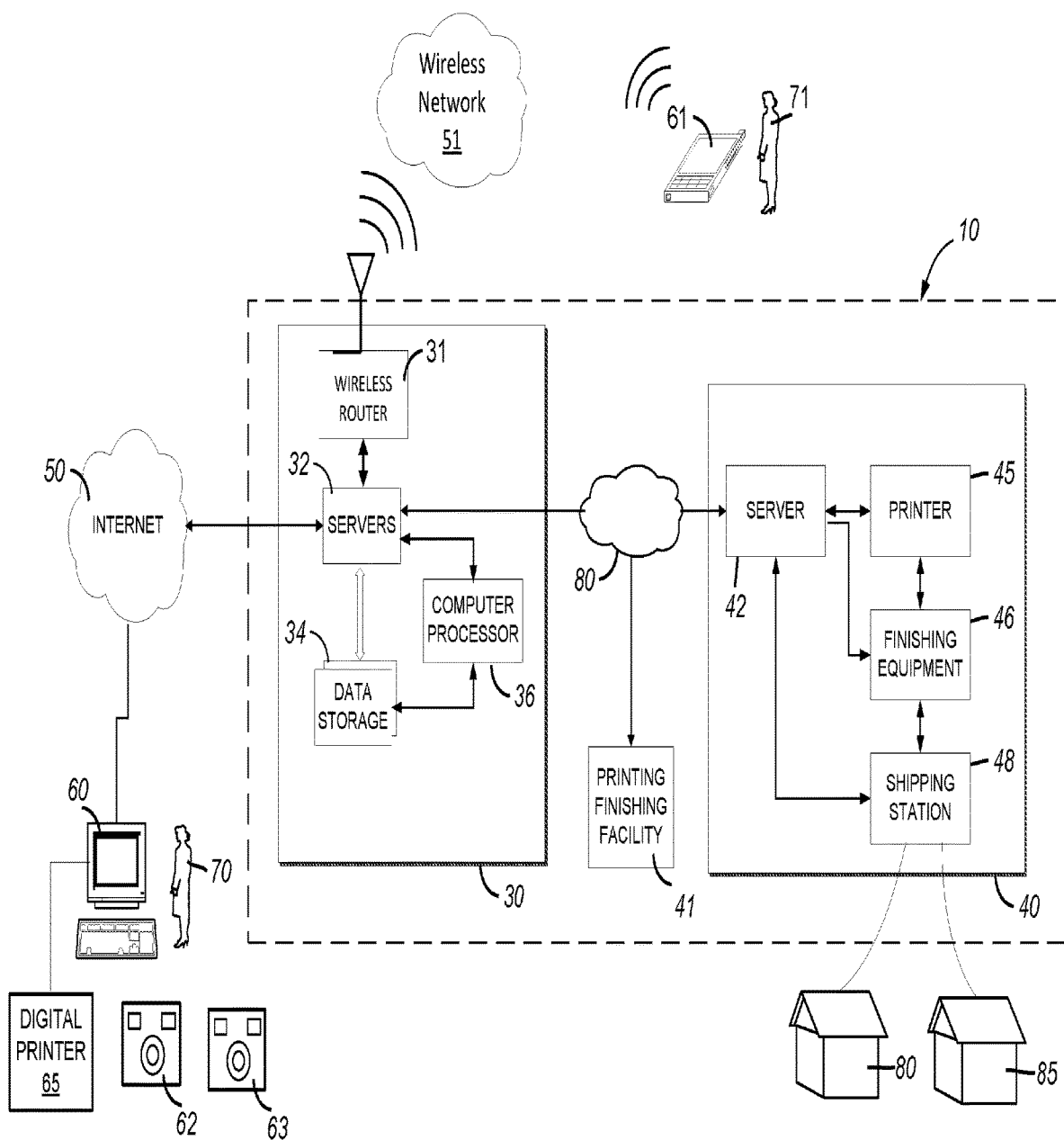
FIG. 1 is a block diagram of a network-based system for creating personalized photo-product designs and making associated photo products in accordance with the present invention.

Referring to FIG. 1, a network-based imaging service system 10 includes a data center 30, one or more product fulfillment centers 40, 41, and a computer network 80 that facilitates communications between the data center 30 and the product fulfillment centers 40, 41. The network-based imaging service system 10, operated by an image service provider such as Shutterfly, Inc., allows users 70, 71 to organize and share images via a wired network or a wireless network 51, create photo-product designs, and order personalized photo products. The product fulfillment centers 40, 41 can fulfill photo products ordered by users 70, 71.

The data center 30 includes one or more servers 32 configured to communicate with user devices (60, 61) operated by users 70, 71 through the Web or a mobile application, a data storage 34 for storing user data, image and design data, and product information, and computer processor(s) 36 for rendering images and product designs, analyzing and organizing images, and analyzing and understanding user behaviors and preferences. The user data includes account information, discount information, order information, relationship, and important dates associated with each user.

The users 70, 71 can view, edit, organize, and share images, and create designs and order personalized photo products using a mobile application or a browser by accessing the website. Images can also be uploaded from the mobile device 61 or the computer device 60 to the server 32 to allow the user 70 and stored at the data center 30. The images or videos stored in the data storage 34, the computer device 60, or the mobile device 61 usually include groups of photos or videos taken at different events and occasions. If users 70, 71 are members of a family or a group (e.g. a soccer team), the images from the cameras 62, 63 and the mobile device 61 can be grouped together to be incorporated into a photo product such as a photobook, or used in a blog page for an event such as a soccer game.

The users 70, 71 can order a physical product based on the design of the photo product, which can be manufactured by the printing and finishing facilities 40 and 41. For fulfilling personalized image products, the product fulfillment center 40 includes a server 42 that receives the design of the photo product, one or more printers 45 for printing images, finishing equipment 46 for operations such as cutting, folding, binding the printed image sheets, and shipping stations 48 for verifying the orders and shipping the orders to recipients 180 and 185. Examples of the printers 45 include can be digital photographic printers, offset digital printers, digital printing presses, and inkjet printers. The finishing equipment 46 can perform operations for finishing a complete image-based product other than printing, for example, cutting, folding, adding a cover to photo book, punching, stapling, gluing, binding, and envelope printing and sealing. The shipping stations 48 may perform tasks such as packaging, labeling, package weighing, and postage metering. A recipient receives the physical product with messages from the users at locations 90, 95. The recipient can also receive a digital version of the design of the photo product over the Internet 50 and/or a wireless network 51.

In the present disclosure, the term "personalized" (or "individualized" or "customized") refers to content such as photos, text, design elements, layouts, or styles that is specific to a user, a recipient, a gift product, or an occasion. A photo product can include a single page or multiple pages. Each page can include one or more images, text, and design elements positioned in proportions in a particular layout. Examples of personalized photo products include photobooks, personalized greeting cards, photo stationeries, photographic prints, photo posters and photo banners, photo banners, photos on canvas, art prints, framed prints, duvet, photo bags, photo playing cards, photo T-shirts, photo mugs, photo aprons, photo magnets, photo mouse pads, photo phone cases, tablet computer cases, photo key-chains, photo collectors, photo coasters, or other types of photo gifts or novelty items. Photobooks can be in the forms of image albums, scrapbooks, bound photo calendars, or photo snap books, etc.

Figure 2:
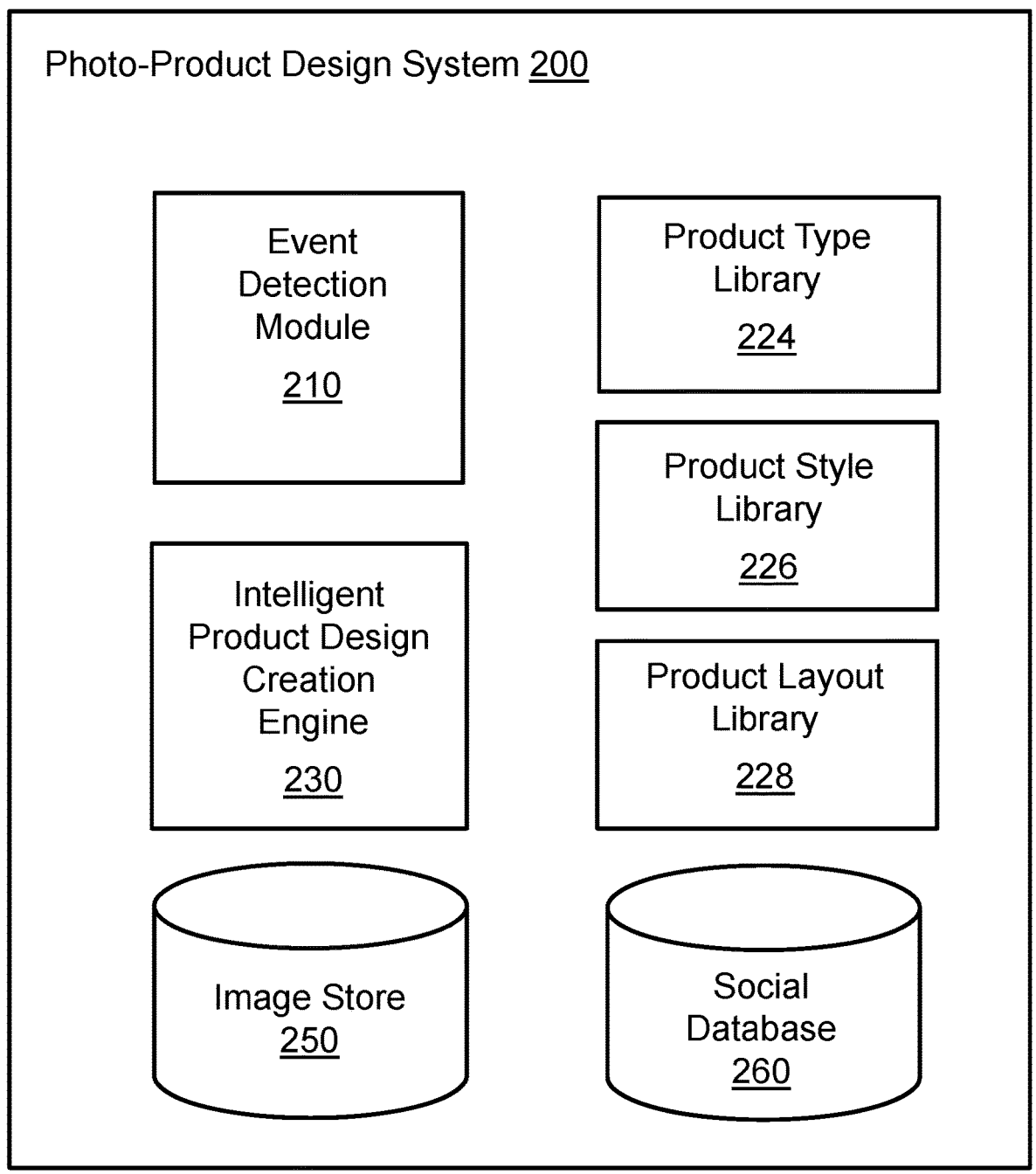
FIG. 2 is a block diagram of a photo-product design system for automatically detecting events and creating photo-product designs for the events in accordance with some embodiments of the present invention.

In some embodiments, referring to FIGS. 1 and 2, a photo-product design system 200 is provided to save users' time and effort in creating photo-product designs to better preserve memories and tell stories. The photo-product design system 200 includes an event detection module 210 and an intelligent product design creation engine 230, which can both reside on a user device such as a mobile phone. The event detection module 210 automatically identifies events that the user has attended using properties associated with the image and other information stored on the user device.

The photo-product design system 200 also includes a product type library 224, a product style library 226, and a product layout library 228, which respectively stores the product types, the product styles, and product layouts for personalized photo products. Product types are normally the types of products that can be manufactured at the printing and finishing facilities 40 and 41 operated by the online image service provider or third party providers. Product styles and product layouts can include pre-stored lists of styles and layouts, and can also include those dynamically generated by the photo-product design system 200.

In the present disclosure, the phrase "product style" refers to the background design, embellishments, the color scheme, or other design themes, characteristics, topics or elements of a photo product. The phrase "product layout" (or page layout) specifies the number, the sizes, and the positions of images on a page, the gaps between the images and at the border of the page. "Product layout" can also include positions and sizes of text and other design elements.

The photo-product design system 200 can also include an image store 250, and a social database 260. The image store 250 stores user captured photos or stock photos managed by the online image service provider. The social database 260 stores relationships (family members and friends) of a user, and face images and face models for the family members and the friends of the user.

The intelligent product design creation engine 230 can automatically create a photo-product design for the an event identified by the event detection module 210. The intelligent product design creation engine 230 uses information and analyses on the event and other intelligence such as social data from the social database 260, to automatically select most suitable photos at different scenes and/or in different days of the event to incorporate into the photo-product design. The intelligent product design creation engine 230 also selects a product type, a product style, and product layouts respectively from the product type library 224, the product style library 226, and the product layout library 228.

The photo-product design system 200 can be formed by processors and memory on a user device (60, 61) such as a mobile phone or a user computer. In some cases, part of the photo-product design system 200 can reside in a central location or a cloud system. For example, part of the product type library 224 may reside on the servers 32 and the data storage 34 in the data center 30. Newly developed product type styles may be first updated at the central location or the cloud, then updated to t user devices at scheduled times.

Figure 3:
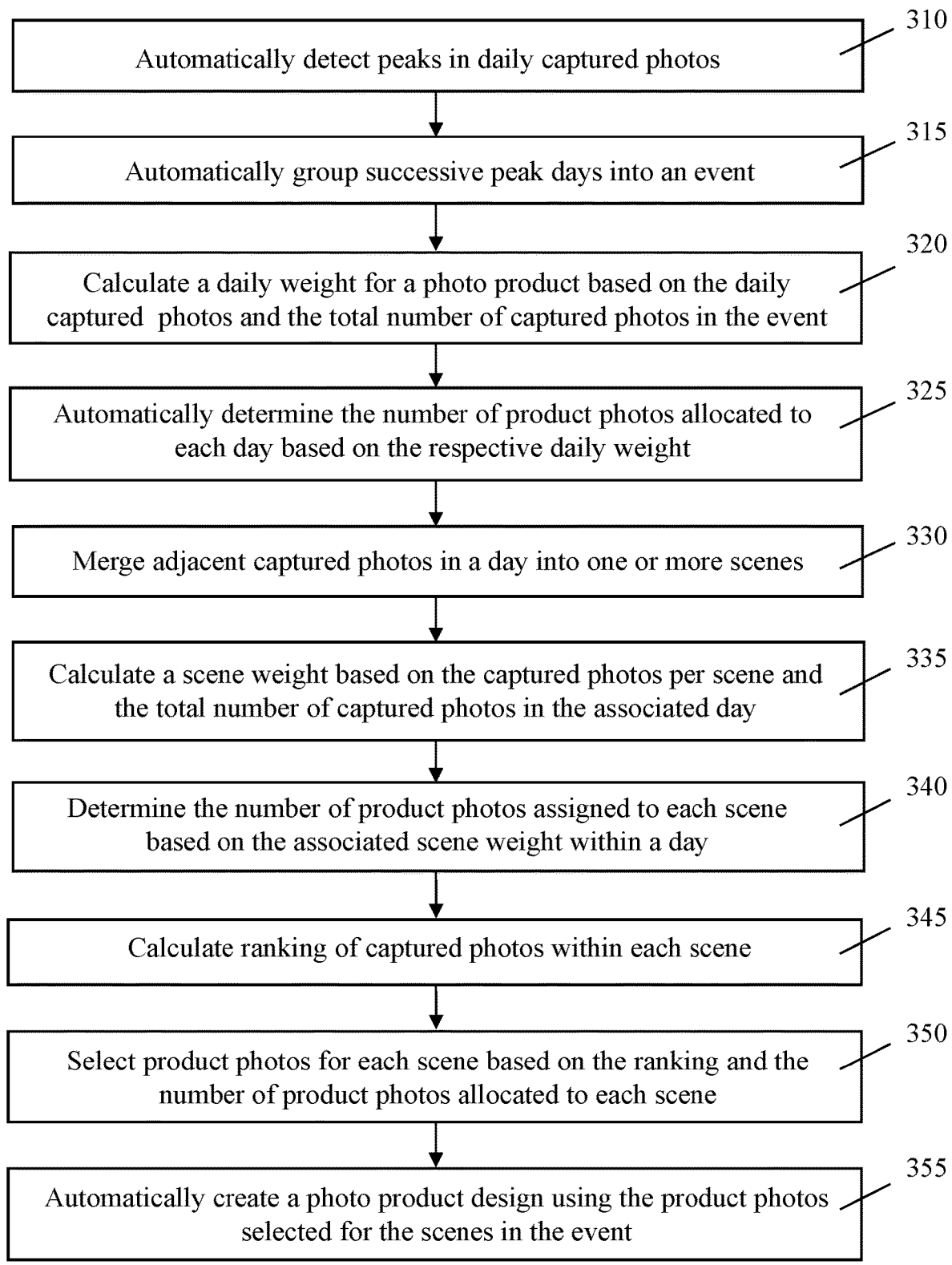
FIG. 3 is a flow diagram for automatically detecting events and creating photo-product designs for the events in accordance with some embodiments of the present invention.
Figure 4:
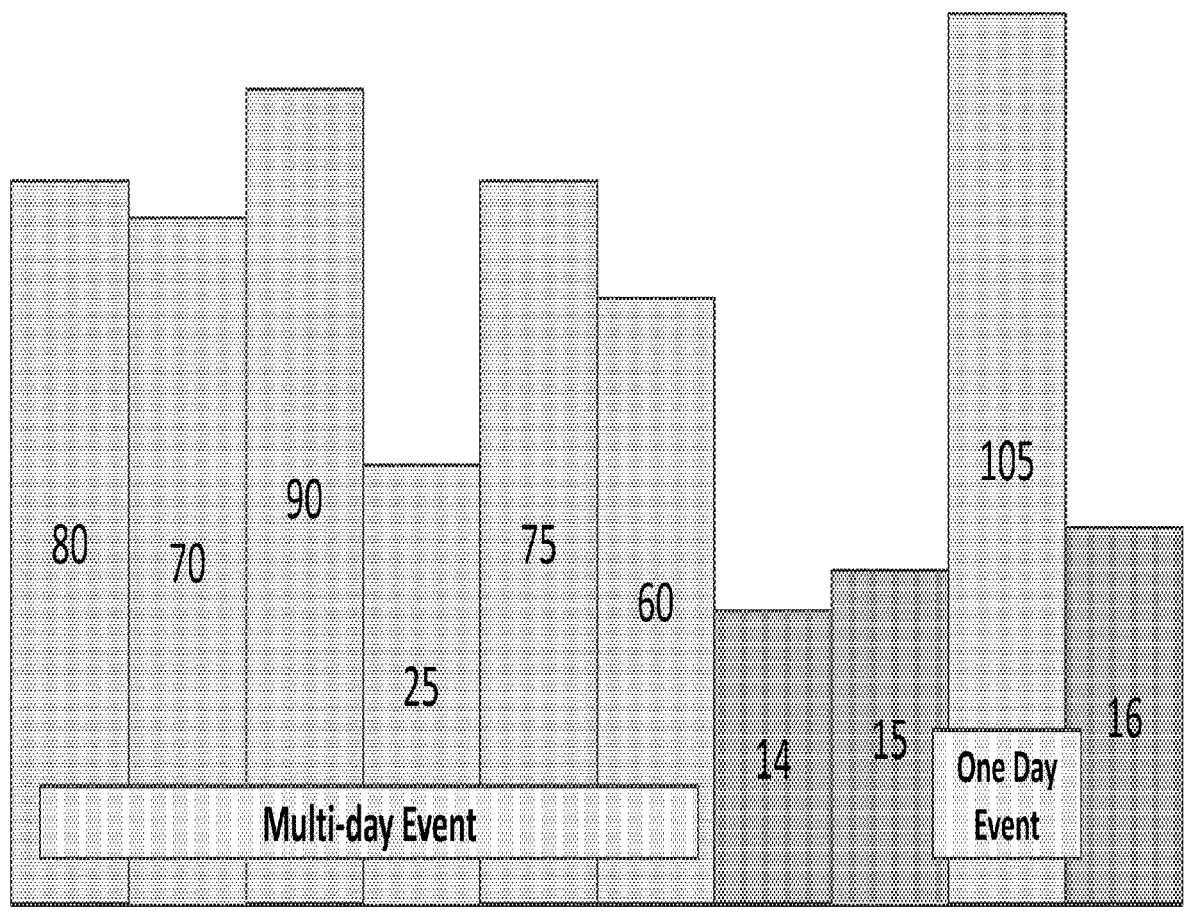
FIG. 4 illustrates an example of the distribution of photos captured by one or more user devices over several days.

Referring next to FIGS. 2-4, images captured by user devices (e.g. 60, 61) are stored in the image store 250. Image capture time is one of the most important properties associated with the images. The event detection module 210 can conduct analyses on the distribution of the captured images over time to identify significant events participated by the users. The event detection module 210 first automatically detects peaks in daily captured photos (step 310) relative to the average number of photos captured each day. For instance, the number of captured photos for an event day can be at least 50% higher, or 100% higher, than the average number of daily captured photos. For example, referring to FIG. 4, if a user takes about 15 photos on the average each day, the daily captured photos in numbers of 80, 70, 90, 25, 75, 60 and 105 represent large deviations from the daily average of 15, which indicates a significant event(s) that the user has participated. The events can last only a single day or over multiple days.

In the present disclosure, the phrase "captured photo" refers to a photo captured by one or more user devices. The phrase "product photo" refers to a photo to be incorporated into a photo product.

The event detection module 210 next automatically groups successive days that have their daily captured photos above the daily average (step 315). For example, in FIG. 4, the successive days having their respective photo captures of 80, 70, 90, 25, 75, and 60 can be initially grouped into a single event. It should be noted that the event detection module 210 can further analyze the content in the captured photos and possibly divide the six days into two or more events.

The intelligent product design creation engine 230 selects a photo-product type based on the number of captured photos in the events and other properties associated with the captured photos. (step not shown in FIG. 3) For example, the selection of a photobook as photo-product design requires typically more than 50 product photos, which can be selected to be incorporated into a photobook. A photo gift, photo stationery, or home decor may be selected for an event having fewer product photos. The intelligent product design creation engine 230 can also automatically select a product style and product layout(s) for one or more pages for the selected photo-product type. (step not shown in FIG. 3) The product style selection may depend on the type of event that the event detection module 210 has identified. For example, geo location metadata of the captured photos may indicate whether the photos are taken at popular vacation places. The time of the event may also indicate whether the event is related to graduation, a birthday, or an anniversary. Face and object recognition may also indicate whether the event is related to a wedding, baby birth, birthday party. Product layouts or page layouts are related to the number of pages, and the number of images assigned to each scene or each day, which are preferably displayed on the same pages.

Figure 5:
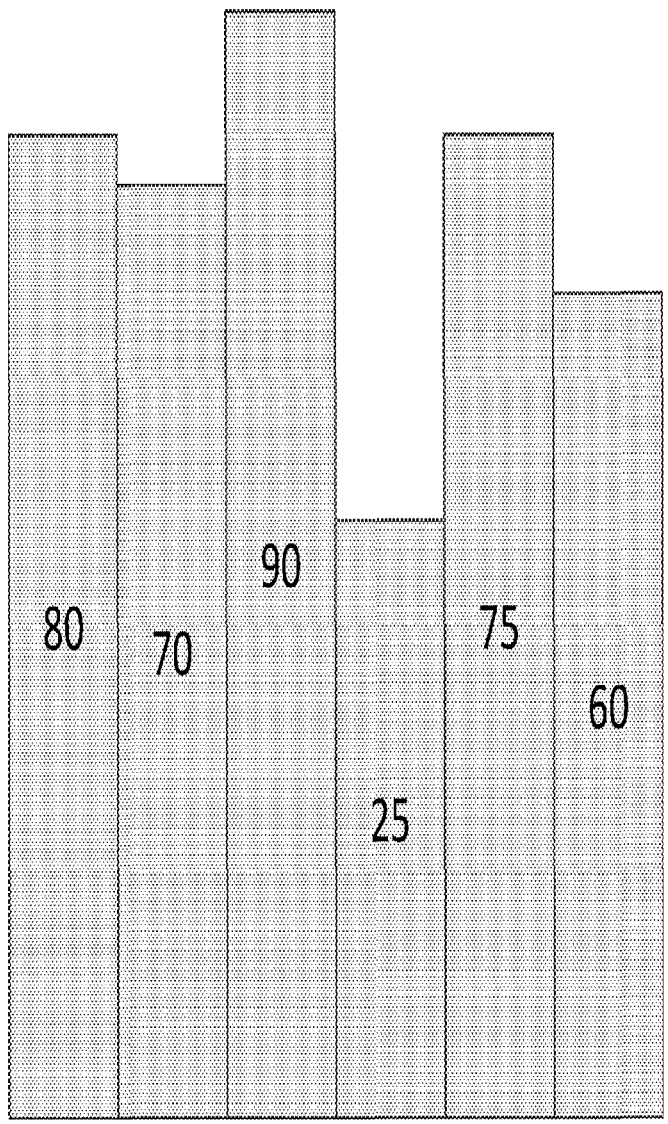
FIG. 5 illustrates statistics of photos captured during a multi-day event identified in the photos in FIG. 4 and daily weights for allocating photos captured in different days in the multi-day event to a photobook design.

Next, a daily weight is automatically calculated for a photo product based on the photos captured each day and the total number of captured photos in the event (step 320). For example, referring to FIGS. 4 and 5, the multi-day event includes 400 images. The intelligent product design creation engine 230 selects a photobook to create based on the captured photos at the event. Daily weights can be computed based on the captured photos on each day versus the total number of photos (e.g. 400) at the event. For instance, the daily weight for a day can be simply the ratio of the number of photos taken on that day to the total number of photos taken at the event. In FIG. 5, the daily weights for the multi-day event are 20%, 17.5%, 22.5%, 6.25, 18.75%, and 15% respectively for the size days. For a single-day event, the daily weight for that day is 100%.

The number of product photos allocated to each day is then automatically determined based on the respective daily weight within an event (step 325). For example, referring to FIG. 5, given 100 product photos are chosen for the photobook to be designed, 20, 17, 23, 6, 19, and 15 are respectively allocated to each day. The product photos allocated to each day can be calculated by the intelligent product design creation engine 230 by multiply the corresponding daily weight by the total number of product photos in the photo-product design (e.g. a photobook).

Next, within each day, the event detection module 210 automatically separates the captured photos in a day into one or more scenes (step 330), which can be accomplished by merging adjacent captured photos in a day into a scene group (step 330). For example, each captured photo in a day can be initially set in a separate scene. The captured photos taken within a short time interval are compared. The adjacent captured photos that have similar content and geo locations are merged into the same scene group. The process is iterated until all the captured photos in a scene group meet a predetermined criterion such as similar content, color scheme, and geo locations, etc. As a result, the captured photos in a day can be divided into one or more scene groups.

Figure 6:
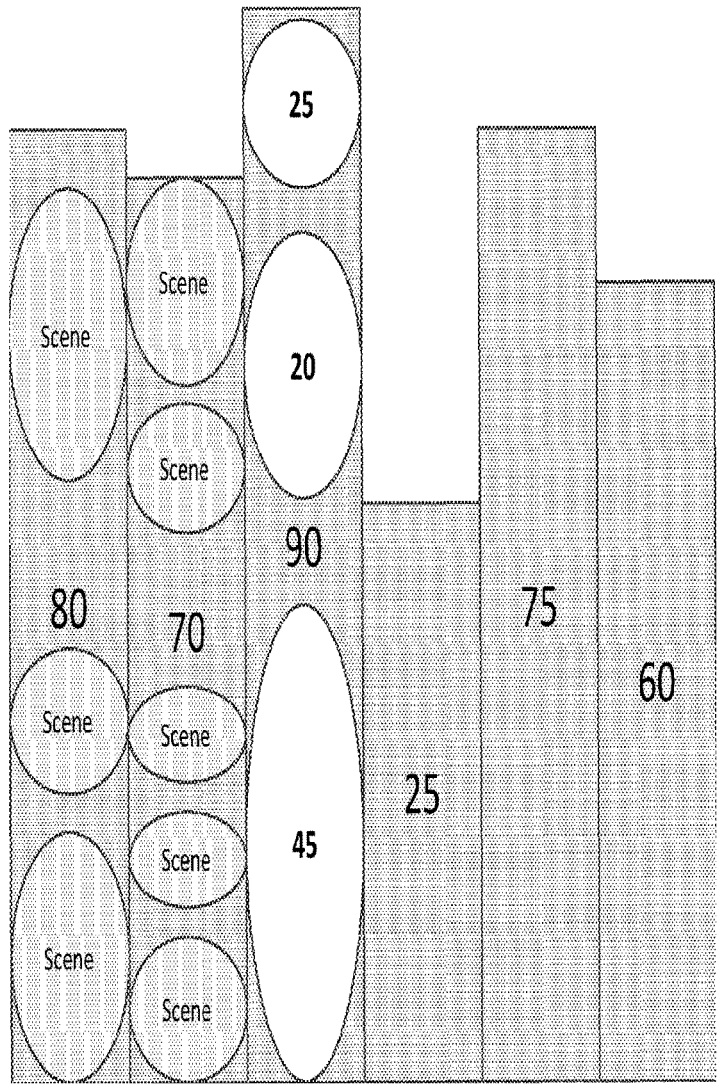
FIG. 6 illustrates the distribution of photos captured at different scenes within a day in the multi-day event in FIG. 5 and scene weights for allocating photos from different scenes to a photobook design.

A scene weight for a photo product is calculated based on the captured photos per scene and the total number of captured photos in the day (step 335). For example, referring to FIG. 6, day 3 of the multi-day event has 90 captured photos, a day weight of 22.5%, and 23 product photos allocated for that day to be included in a photobook design. Three scenes are automatically identified, respectively having 45, 20, and 25 captured photos. The scene weights are automatically calculated by the intelligent product design creation engine 230 using the ratios of the captured photos in the individual scenes over the total number of captured photos in day 3. For example, the scene ratio for scene 1 can be 45/90=50%. As shown in FIG. 6, the three scenes respectively have scene ratios of 27.8%, 22.2%, and 50%. The number of product photos assigned to each scene is determined based on the associated scene weight within a day (step 340). For example, referring to FIG. 6, since 23 product photos are allocated to day 3 in the photobook design, the product photos from each of the three scenes can be calculated by the total number of product photos allocated for the photobook for that day (23) multiplied by their respective scene weights. For example, the second scene is assigned with 5 product photos (22.2% times 23) to be added to the photobook design. For a day that contains only a single scene, the scene weight is 100% for that scene.

Figure 7:
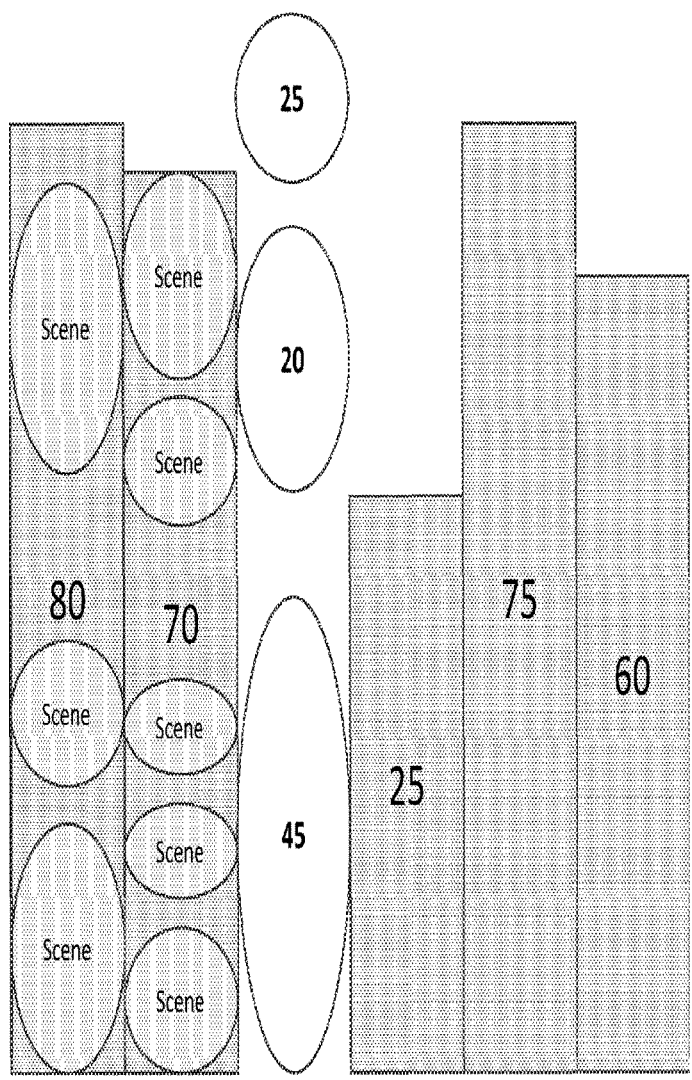
FIG. 7 illustrates the allocations and selection of photos to a photobook design based on the distribution of photos between scenes within a day in the multi-day event in FIG. 6.

Captured photos are then automatically ranked within each scene (step 345) by the intelligent product design creation engine 230. For example, scores of the captured photos can be calculated within each scene based on predetermined criteria, which for example may depend parameters such as image quality, significance to the user(s), redundancy or similarity between captured photos, etc. Captured photos with higher image quality and social relevance (based on relationship stored in the social database 260) have higher scores and are ranked higher. Captured photos that similar or redundant are trimmed and only one or a selected few are assigned with high score or high ranking. For example, referring to FIG. 7, the 45 captured photos in scene 3 on day 3 are ranked, among which 12 captured photos having higher scores are selected as product photos to be incorporated into the photobook design.

Figure 8:
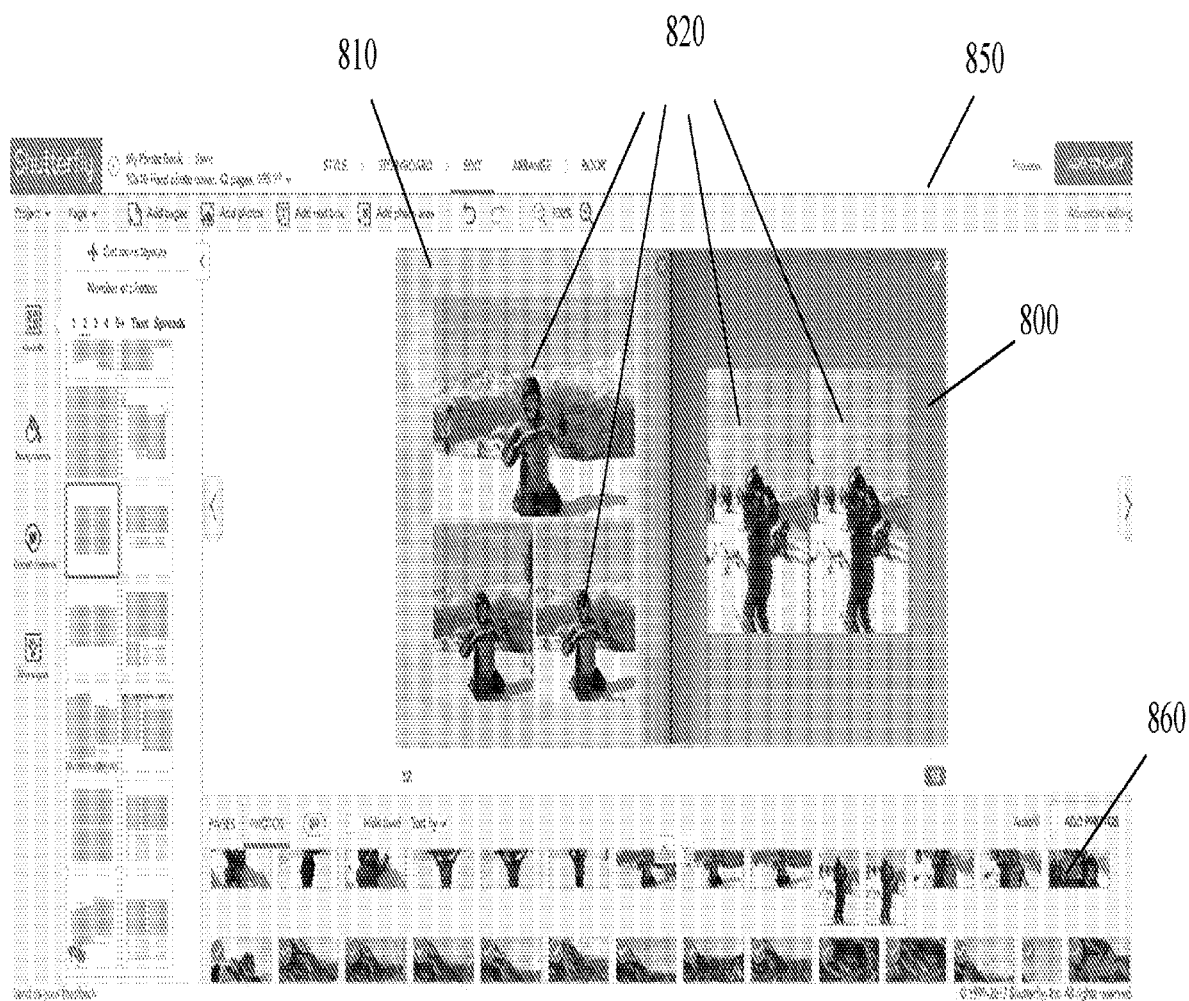
FIG. 8 illustrates a portion of a photobook design automatically created for the multi-day event.

Product photos are automatically selected for each scene by the intelligent product design creation engine 230 based on the image ranking and the number of product photos allocated to each scene (step 350). The selections of product photos are repeated for all scenes and in all the days in a multi-day event. A photo-product design 800 (FIG. 8) is automatically created by the intelligent product design creation engine 230 in part based on the product photos selected for the scenes during the event (step 355). The photo-product design 800 can include one or more pages 810 and product photos 820 selected from one or more scenes from an event. Afterwards, a user can review and edit one or more pages of the photo-product design 800 at a user interface 850 on the user device. For example, user can select other captured photos 860.

The presently disclosed method and system can include one or more the following advantages. The activities and events that a user has participated are automatically identified without user input. These identified events and activities are used as triggers to create photo-product designs without user initiation. The photo-product types, the photo-product styles, and the photo-product layouts are automatically selected for the event. The disclosed method and system can significantly save users' time and make it much more convenient for users to use their photos on their devices. The disclosed method and system can proactively identify photo products that the users themselves may not have realized, which help the users to preserve their memories.

It should be noted that the above disclosed method and system can be used to detect other types of events and to create other type of photo products than the examples provided above. The detection of events on user devices can be conducted in conjunction with other information retrieved and analysis results acquired. Portions of the above disclosed operations can be implemented by more than one user device, or at a central network locations such as a cloud system. Moreover, the events can be identified based on other criteria than the examples described above.

It should be understood that the presently disclosed systems and methods can be compatible with different devices or applications other than the examples described above. For example, the disclosed method is suitable for desktop, tablet computers, mobile phones and other types of network connectable computer devices. The photo products compatible with the present invention are not limited to the examples described above.

What is claimed is:

1. A method for automatically detecting events for generating a photo product, the method comprising:
   receiving photos captured over a plurality of days from a user computing device;
   without user initiation:
   automatically identifying an event comprising one or more days of the plurality of days based on daily numbers of the captured photos over the plurality of days, wherein the identified event is associated with at least one subset of the captured photos;
   automatically selecting a photo-product design for the identified event, wherein the selected photo-product design defines a total number of photos to be included in the photo-product design;
   for each subset of captured photos associated with the identified event, determining a subset weight based on a number of captured photos associated with the subset and a total number of captured photos associated with the identified event;
   automatically determining a number of product photos allocated to each subset of the identified event based on a multiplication of the subset weight determined for each subset of the identified event and the total number of product photos to be included in the photo-product design;
   automatically selecting product photos from the at least one subset of the captured photos for the identified event according to the number of product photos allocated to each subset of the identified event; and
   automatically generating a photo-product design for the identified event including the selected product photos; and
   providing the generated photo-product design to a user computer device for display on the user computing device.

2. The method of claim 1, wherein the photos are captured by a camera that is coupled to or integrated with the user computing device.

3. The method of claim 1, further comprising:
   wherein automatically generating the photo-product design for the identified event comprises:

automatically selecting the photo-product design to be created for the event by automatically selecting a photo-product type, a style, and a layout for the photo-product design; and
  inserting the selected product photos into the layout of the photo-product design.
4. The method of claim 1, further comprising:
  automatically determining at least one subset of the captured photos associated with the identified event, including:
    analyzing the content in the captured photos, wherein the content includes face images and face models within the captured photos; and
    identifying properties associated with the captured photos, wherein the properties include geo location metadata and a time interval associated with the captured photos.
5. The method of claim 1, wherein the subset weight is determined by the number of captured photos associated with the subset of the captured photos divided by the total number of captured photos associated with the identified event.
6. The method of claim 1, further comprising:
  automatically merging adjacent captured photos in a subset into one or more scenes;
  determining a scene weight for the photo-product design based on the numbers of captured photos in the one or more scenes;
  automatically determining a number of product photos allocated to each of the one or more scenes based on associated scene weight; and
  automatically selecting product photos from the captured photos at each of the one or more scenes according to the number of product photos allocated to each of the one or more scenes.
7. The method of claim 6, wherein the scene weight is determined by a number of captured photos of an associated scene divided by a total number of captured photos in an associated subset of the identified event.
8. The method of claim 7, wherein the number of product photos allocated to each of the one or more scenes is determined by a multiplication of the associated scene weight and the number of product photos allocated to the associated subset.
9. The method of claim 1, wherein automatically selecting the product photos for each subset of the captured photos associated with the identified event comprises:
  ranking the captured photos within the subset; and
  automatically selecting the captured photos based on the ranking.
10. The method of claim 9, wherein the ranking of each captured photo is determined by a score associated with each captured photo, wherein the score is calculated based on a predetermined criterion, including at least one of image quality, significance to a user, redundancy between captured photos, similarity between captured photos, and social relevance.
11. The method of claim 1, wherein automatically identifying the event comprises:
  determining an average number of captured photos per day over the plurality of days; and
  comparing a daily number of captured photos over the plurality of days to the average number of captured photos per day over the plurality of days.
12. The method of claim 1, wherein the event is identified when the daily number of captured photos is at least 50% higher than the average number of captured photos per day.
13. The method of claim 1, wherein the identified event includes a single day.
14. The method of claim 1, wherein the identified event includes multiple days.
15. A photo-product design system for automatically detecting events for generating a photo-product, the photo-product design system comprising:
  at least one processor; and
  at least one memory coupled to the at least one processor and storing instructions that, when executed by the at least one processor, cause the photo-product design system to:
    receive photos captured over a plurality of days from a user computing device;
    without user initiation:
      automatically identify an event comprising one or more days of the plurality of days based on daily numbers of the captured photos over the plurality of days, wherein the identified event is associated with at least one subset of the captured photos;
      automatically select a photo-product design for the identified event, wherein the selected photo-product design defines a total number of photos to be included in the photo-product design;
      for each subset of captured photos associated with the identified event, determine a subset weight based on a number of captured photos associated with the subset and a total number of captured photos associated with the identified event;
      automatically determine a number of product photos allocated to each subset of the identified event based on a multiplication of the subset weight determined for each subset of the identified event and the total number of product photos to be included in the photo-product design;
      automatically select product photos from the at least one subset of the captured photos for the identified event according to the number of product photos allocated to each subset of the identified event; and
      automatically generate a photo-product design for the identified event including the selected product photos; and
    provide the generated photo-product design to a user computer device for display on the user computing device.
16. The photo-product design system of claim 15, wherein to automatically generate a photo-product design for the identified event, the photo-product design system is further caused to, without user initiation:
  automatically select the photo-product design to be created for the event by automatically selecting a photo-product type, a style, and a layout for the photo-product design; and
  insert the selected product photos into the layout of the photo-product design.
17. The photo-product design system of claim 15, wherein the photo-product design system is further caused to:
  automatically determine at least one subset of the captured photos associated with the identified event, including:
    analyzing the content in the captured photos, wherein the content includes face images and face models within the captured photos; and identifying properties associated with the captured photos, wherein the properties include geo location metadata and a time interval associated with the captured photos.

18. The photo-product design system of claim 15, wherein the photo-product design system is further caused to:
   automatically merge adjacent captured photos in a subset into one or more scenes;
   calculate a scene weight for the photo-product design based on numbers of captured photos in the one or more scenes;
   automatically determine a number of product photos allocated to each of the one or more scenes based on associated scene weight; and
   automatically select product photos from the captured photos at each of the one or more scenes according to the number of product photos allocated to each of the one or more scenes.

19. The photo-product design system of claim 15, wherein the photo-product design system is further caused to:
   automatically determine an average number of captured photos per day over the plurality of days; and
   identify the event by comparing the daily numbers of captured photos over the plurality of days to the average number of captured photos per day over the plurality of days.

20. A computer-readable non-transitory memory storing data that, when executed by a processor of a computer, causes the computer to:
   receive photos captured over a plurality of days from a user computing device;
   without user initiation:
      automatically identify an event comprising one or more days of the plurality of days based on daily numbers of the captured photos over the plurality of days, wherein the identified event is associated with at least one subset of the captured photos;
      automatically select a photo-product design for the identified event, wherein the selected photo-product design defines a total number of photos to be included in the photo-product design;
      for each subset of captured photos associated with the identified event, determine a subset weight based on a number of captured photos associated with the subset and a total number of captured photos associated with the identified event;
      automatically determine a number of product photos allocated to each subset of the identified event based on a multiplication of the subset weight determined for each subset of the identified event and the total number of product photos to be included in the photo-product design;
      automatically select product photos from the at least one subset of the captured photos for the identified event according to the number of product photos allocated to each subset of the identified event; and
      automatically generate a photo-product design for the identified event including the selected product photos; and
   provide the generated photo-product design to a user computer device for display on the user computing device.

* * * * *